United States Patent
Amir et al.

(10) Patent No.: US 8,269,855 B2
(45) Date of Patent: Sep. 18, 2012

(54) NARROW BANDWIDTH ILLUMINATION IMAGE PROCESSING SYSTEM AND METHOD

(75) Inventors: Haim Amir, Ramat Hasharon (IL); Amir Eliaz, Moshav Ben-Shemen (IL); Tomer Saar, Raanana (IL)

(73) Assignee: Essence Security International Ltd., Herzelia (IL)

( * ) Notice: Subject to any disclaimer, the term of this patent is extended or adjusted under 35 U.S.C. 154(b) by 484 days.

(21) Appl. No.: 12/354,044

(22) Filed: Jan. 15, 2009

(65) Prior Publication Data
US 2010/0177228 A1    Jul. 15, 2010

(51) Int. Cl.
*H04N 5/235* (2006.01)
*H04N 5/20* (2006.01)
(52) U.S. Cl. .............. 348/229.1; 348/255; 348/528
(58) Field of Classification Search ........... 348/229.1, 348/255, 528
See application file for complete search history.

(56) References Cited

U.S. PATENT DOCUMENTS

| | | | |
|---|---|---|---|
| 6,839,522 B2 | 1/2005 | Grubb | |
| 7,688,359 B2* | 3/2010 | Zhao et al. | 348/229.1 |
| 7,787,110 B2* | 8/2010 | Raguin et al. | 356/71 |
| 8,068,690 B2* | 11/2011 | Itoh | 382/266 |
| 2002/0018655 A1* | 2/2002 | Krabb | 396/661 |
| 2002/0196337 A1 | 12/2002 | Takeyama | |
| 2005/0163372 A1* | 7/2005 | Kida et al. | 382/169 |
| 2006/0067668 A1* | 3/2006 | Kita | 396/182 |
| 2006/0072319 A1* | 4/2006 | Dziekan et al. | 362/249 |
| 2006/0197847 A1* | 9/2006 | Johnson et al. | 348/229.1 |
| 2007/0031138 A1* | 2/2007 | Yamashita | 396/157 |
| 2008/0158258 A1* | 7/2008 | Lazarus et al. | 345/634 |
| 2009/0059316 A1* | 3/2009 | Irwin et al. | 358/474 |
| 2009/0229532 A1* | 9/2009 | Herbert et al. | 119/216 |
| 2009/0278922 A1* | 11/2009 | Tinker et al. | 348/78 |

* cited by examiner

*Primary Examiner* — Hung Lam
(74) *Attorney, Agent, or Firm* — Mark M Friedman

(57) ABSTRACT

A low power color image capturing system having a power source, the system comprising: a narrow bandwidth illuminator adapted to provide illumination having a peak intensity defining a narrow bandwidth; an image capturing device adapted to capture a raw image from an object illuminated by the narrow bandwidth illuminator; and a processor adapted to control the system and having an algorithm operatable upon the raw image to provide a modified image; wherein the modified image has enhanced color intensities over substantially all visible wavelengths.

12 Claims, 4 Drawing Sheets

NARROW BANDWIDTH ILLUMINATION IMAGE PROCESSING SYSTEM AND METHOD

FIELD AND BACKGROUND OF THE INVENTION

The present invention relates to illumination and image processing and specifically to illumination with a narrow bandwidth illuminator to capture and produce color images.

In many applications of CMOS visible-light image capture and processing, so-called "white light"—meaning light exhibiting roughly equal intensities of many colors or wavelengths of in the visible light bandwidth—is used for illumination. One of the reasons white light has traditionally been used is because daytime image capture, especially outdoors, can easily take advantage of available direct or reflected sunlight (i.e. "daylight") which is generally regarded as white light. Because image capture devices have traditionally been developed with sensitivities to sunlight, artificial illumination sources having white light characteristics have been widely applied where daylight/sunlight illumination is not available. Some white light illumination sources take advantage of mixing colored illuminations, as known in the art.

When systems or devices that capture color images capture are constrained to very low power requirements, white light illuminators, whether comprising a singular source or a combination of different colored illuminators, are not acceptable because they tend to exhibit higher energy consumption (due to, but not limited to: dissipated heat of a singular source; and additional power consumption of a combination of colored illuminators) in comparison to similar illuminators having a single color, having a narrow bandwidth, which typically exhibit lower power consumption.

In the specification and claims which follow hereinbelow, the term "narrow bandwidth" is meant to relate to an illuminator exhibiting peak intensity at a corresponding peak wavelength or wavelength range (i.e. "bandwidth"). The illuminator typically exhibits a spectral intensity function with lower illumination intensities for wavelengths other than the intensity corresponding to the peak wavelength or wavelength range. As such, the term "narrow bandwidth" is used to distinguish the peak intensity bandwidth from the entire spectral intensity function of the illuminator. Exemplary typical illuminators having a narrow bandwidth characteristic are red, blue, and green LEDs (light-emitting diodes). Narrow bandwidth illuminators, as referred to in the specification and claims hereinbelow, typically exhibit light in wavelengths substantially in the visible spectrum. A typical narrow bandwidth illuminator also exhibits light in wavelengths covering most of the visible spectrum, but with lower intensities than the peak intensity color (i.e. wavelength), where the characteristic wavelength(s) exhibit the strongest intensities.

Conventional image capture devices designed to capture white light have not heretofore been able to take advantage of a single color or narrow bandwidth illuminator to produce a full color image. Efforts in other fields of endeavor have been made to process incident light from such illuminators to enhance color images. Examples of such prior art are: US Patent Application publication no. 20020196337, by Tayekama, US Patent Application publication no. 20080158258, by Lazarus et al., and U.S. Pat. No. 6,839,522, by Grubb et al., all of whose disclosure are incorporated herein by reference.

There is therefore a need for a low power consumption, a low cost system and a method to take advantage of a narrow bandwidth illuminator to capture and produce color images.

SUMMARY OF THE INVENTION

The present invention relates to illumination and image processing and specifically to illumination with a narrow bandwidth illuminator to produce color images.

According to the teachings of the present invention there is provided, a low power color image capturing system having a power source, the system comprising: a narrow bandwidth illuminator adapted to provide illumination having a peak intensity defining a narrow bandwidth; an image capturing device adapted to capture a raw image from an object illuminated by the narrow bandwidth illuminator; and a processor adapted to control the system and having an algorithm operatable upon the raw image to provide a modified image; wherein the modified image has enhanced color intensities over substantially all visible wavelengths. Preferably, the algorithm is adapted to selectively amplify intensities of wavelengths outside of the narrow bandwidth of the raw image to yield the modified image. Most preferably the algorithm is further adapted to selectively amplify intensities of wavelengths within the narrow bandwidth of the raw image to yield the modified image. Typically, the modified image has intensities substantially equal to the peak intensity.

Most typically, the narrow band illuminator is a LED. Preferably, the LED color is chosen from the list including: green, blue, and red. Most preferably, the image capturing device is chosen from a list including: CMOS camera and CCD. Typically, the power source is a battery.

According to the teachings of the present invention there is further provided, a method of low power color image capturing using a system having a power source, the method comprising the steps of: taking a narrow bandwidth illuminator to provide illumination having a peak intensity defining a narrow bandwidth; providing an image capturing device to capture a raw image from an object illuminated by the narrow bandwidth illuminator; and using a processor to control the system and having an algorithm which operates upon the raw image to provide a modified image; wherein the modified image has enhanced color intensities over substantially all visible wavelengths. Preferably, the algorithm selectively amplifies intensities of wavelengths outside of the narrow bandwidth of the raw image to yield the modified image. Most preferably, the algorithm further selectively amplifies intensities of wavelengths within the narrow bandwidth of the raw image to yield the modified image. Typically, the modified image has intensities substantially equal to the peak intensity.

Most typically, the narrow band illuminator is a LED. Preferably, the LED color is chosen from the list including: green, blue, and red. Most preferably, the image capturing device is chosen from a list including: CMOS camera and CCD. Typically, the power source is a battery.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
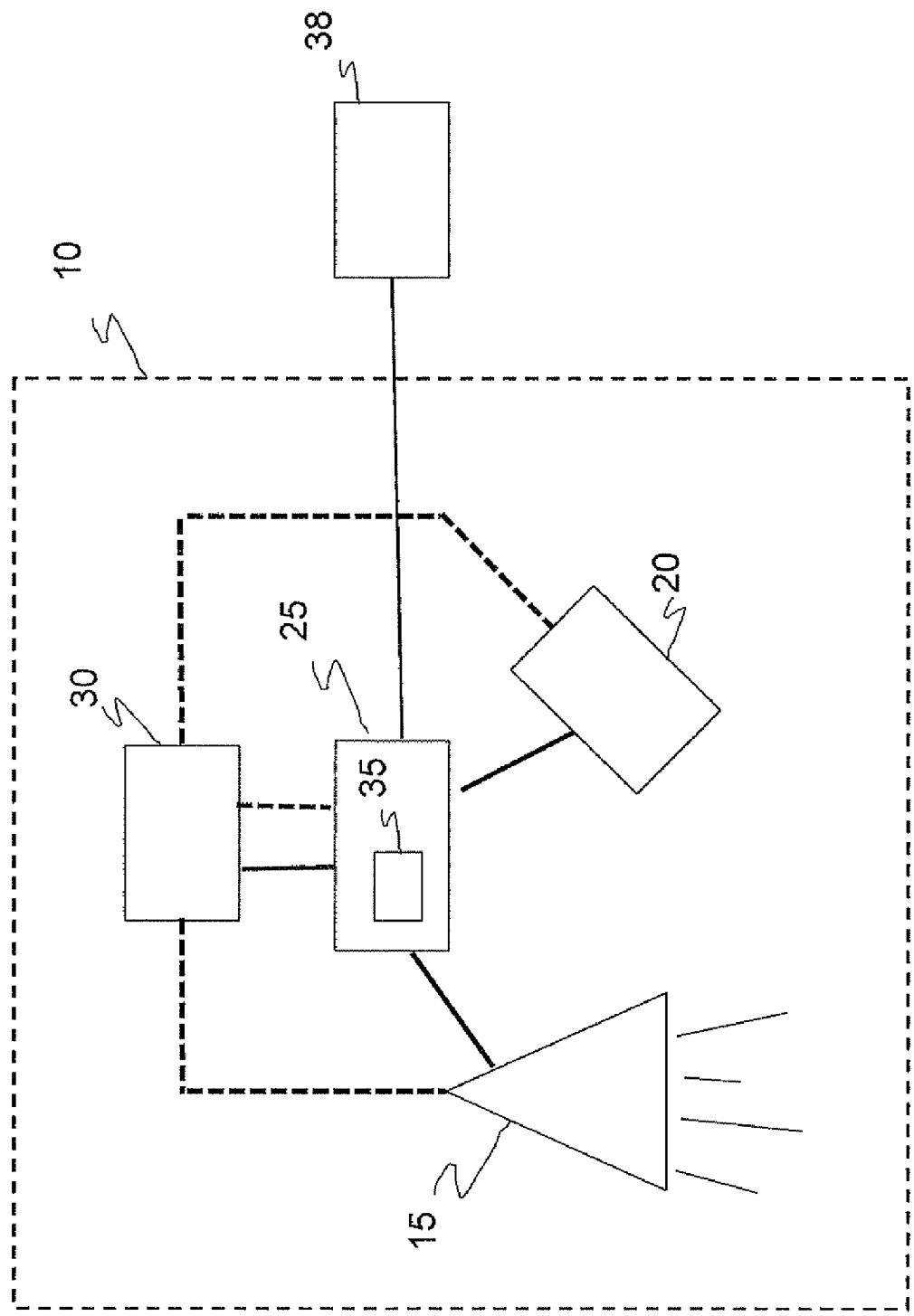
FIG. 1 is a block diagram of a low power color image capturing system, in accordance with an embodiment of the current invention.

The present invention relates to illumination and image processing and specifically to illumination with a narrow bandwidth illuminator to capture and produce color images. Reference is now made to FIG. 1, which is a block diagram of a low power color image capturing system 10, in accordance with an embodiment of the current invention. Low power color image capturing system 10 includes a narrow bandwidth illuminator 15, an image capturing device 20, a processor 25, and a power source 30. Image capturing device 20 is oriented to capture an image of an object (not shown in the figure) illuminated by narrow bandwidth illumination from illuminator 15. In the specification and claims hereinbelow, the terms "captured image" and "raw image" are meant to refer to the same thing, namely the image captured by the image capturing device. The raw image is therefore differentiated from an image resultant from processing of the raw image as described hereinbelow. Processor 25 controls and coordinates operation of narrow bandwidth illuminator 15, image capturing device 20, and power source 30, indicated by the solid lines in the figure. Power source 30 provides power for narrow bandwidth illuminator 15, image capturing device 20, and processor 25 as indicated by the dotted lines in the figure. Narrow bandwidth illuminator 15 is designed to use minimal power, both in terms of the output device power and because it is typically operated only when illumination is necessary. Narrow bandwidth illuminator 15 may be, inter alia, a green LED. An exemplary green LED having characteristics of narrow bandwidth illuminator 15 is the LUXEON K2 Star green LED, whose wavelength characteristics are indicated on page 19 of the LUXEON Technical Datasheet DS51, 2008, found at http://www.philipslumileds.com/pdfs/DS51.pdf (found hereinbelow as the Appendix), whose disclosure is incorporated herein by reference. Additional characteristics of narrow bandwidth illuminator 15 are noted hereinbelow.

Image capturing device 20 may be, inter alia, a CMOS camera, a CCD camera or other device known in the art to capture images in at least the visible spectrum. Processor 25 includes, inter alia, an algorithm 35 to process the image captured by the image capturing device. Characteristics of algorithm 35 are further described hereinbelow. Processor 25 may additionally or optionally include additional modules (not shown in the figure) for communication (wired or wireless) with other remotely located command and/or telemetry devices 38 which may utilize the captured images.

Power source 30 is usually a battery; however the power source may also be some other means of limited power. Power source 30 is designed to be compact and to supply power to the system for an extended time period, such as months or even years. As such, the system has an overall low power characteristic due primarily to limitations of power source 30.

Figure 2:
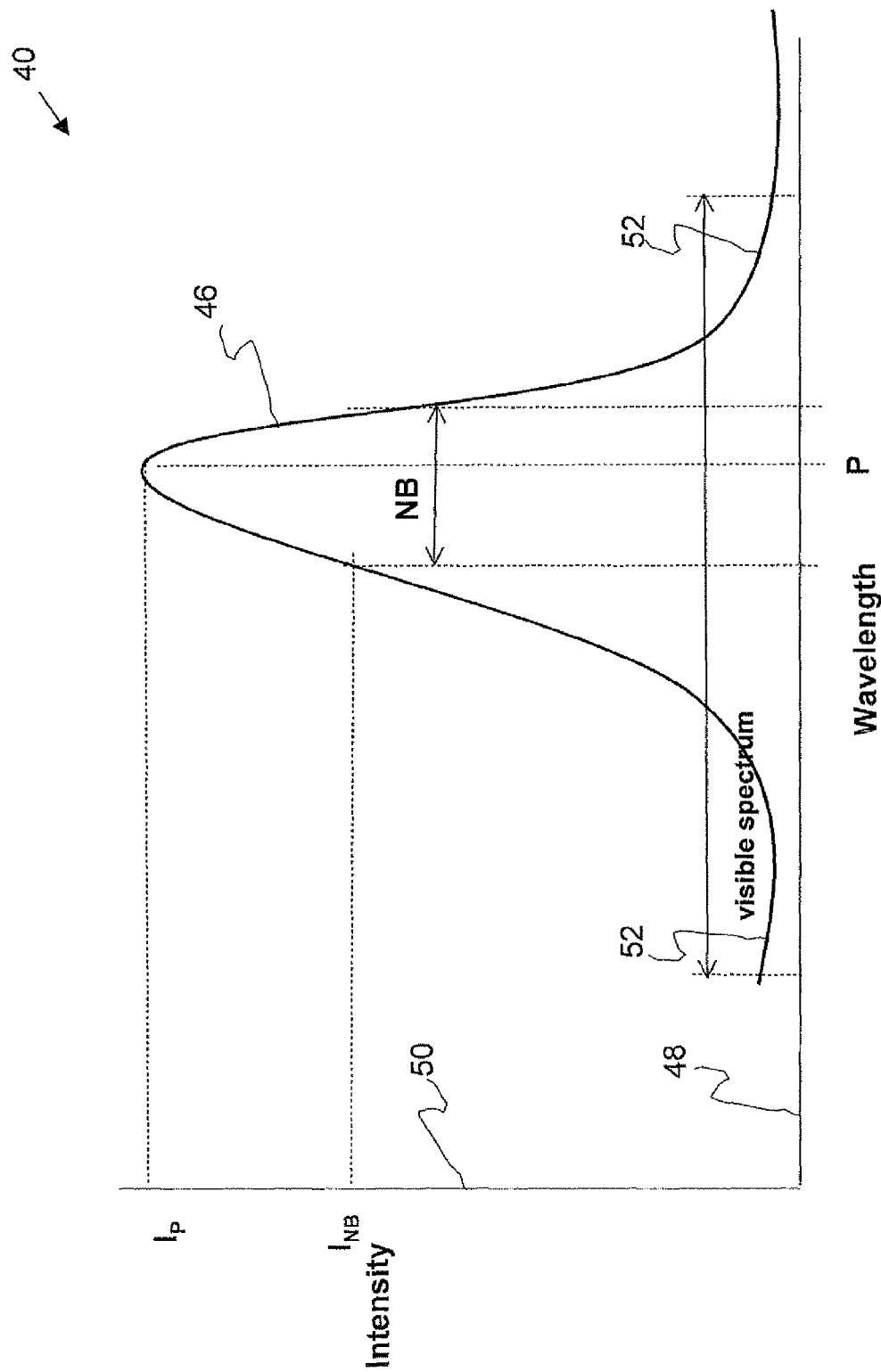
FIG. 2 is a spectral response diagram showing a response function of the narrow bandwidth illuminator of FIG. 1, in accordance with an embodiment of the current invention.

Reference is now made to FIG. 2, which is a spectral response diagram 40 showing a response function 46 of the narrow bandwidth illuminator of FIG. 1, in accordance with an embodiment of the current invention. Spectral response diagram 40 has an abscissa 48, indicated as "wavelength" and an ordinate 50, indicated as "intensity", as known in the art. In one embodiment of the current invention response function 46 of the narrow bandwidth illuminator is characteristic of visible green illumination, meaning illumination having a spectral response of a wavelength range of approximately 470 to 620 nanometers. One way to determine response function 46 is to illuminate a white target (e.g., a surface with known and/or fixed color and emission characteristics, the white target not shown in the figure) by narrow bandwidth illuminator 15 and to capture one or more raw images from the target. The image or images are then analyzed to yield response function 46. The response function exhibits a peak intensity value of $I_P$ at a wavelength of P. The intensity of the response function drops significantly from $I_P$ at wavelengths longer and shorter than P, yielding characteristic tails 52 covering substantially most of the visible spectrum, the tails exhibiting finite intensity values that are significantly less than $I_P$, as indicated in the figure, At an intensity value $I_{NB}$ a narrow bandwidth (NB) is defined as the wavelength bandwidth of the response function, characterized by intensity values less than or equal to $I_P$. One definition of NB is the bandwidth defined by intensity values of at least 50% of $I_P$, although other definitions for NB may also be applied.

Figure 3:
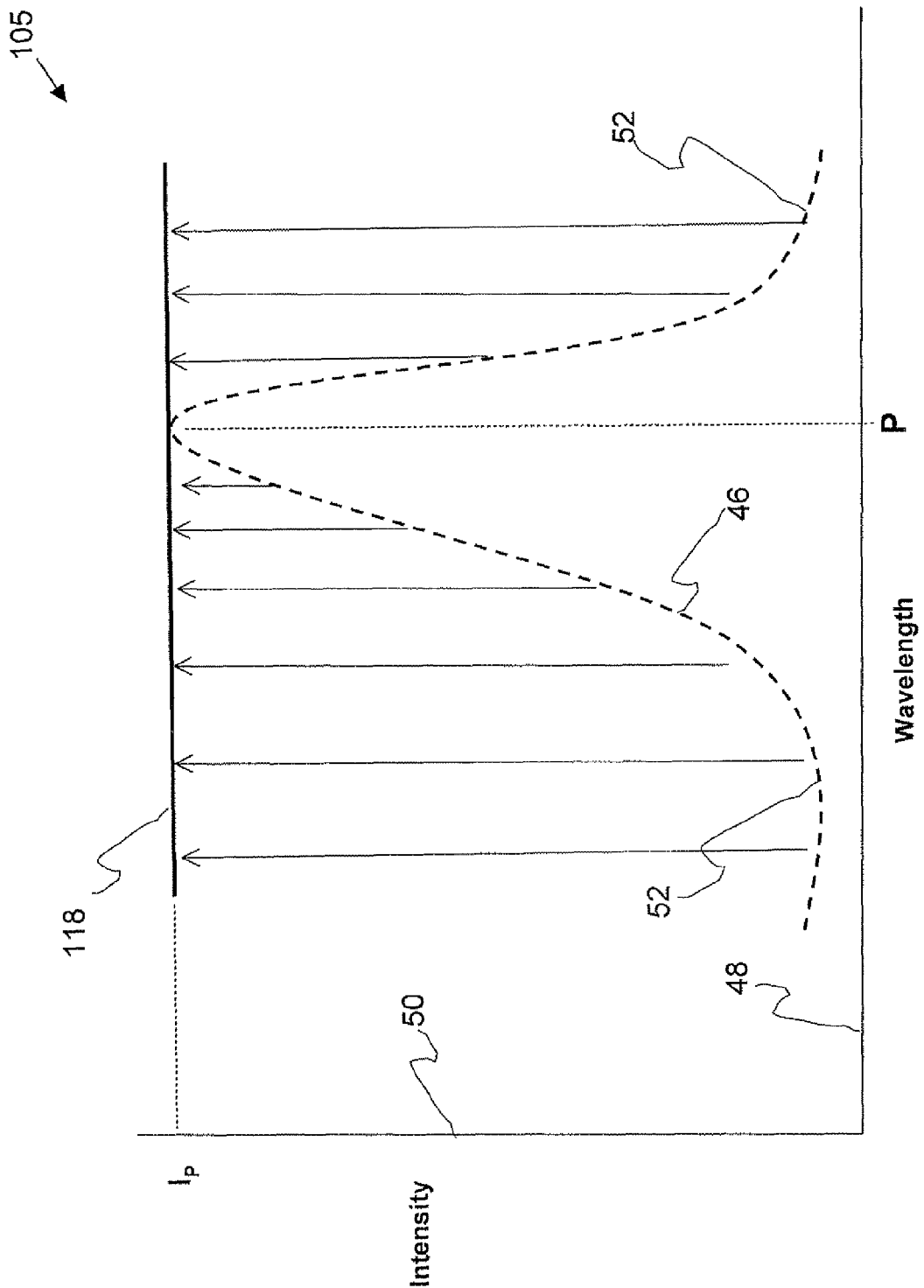
FIG. 3 is a spectral response diagram showing the response function of FIG. 2, in accordance with an embodiment of the current invention.

Reference is now made to FIG. 3, which is a spectral response diagram 105 showing response function 46 of FIG. 2, in accordance with an embodiment of the current invention. Apart from differences described below, response function 46, abscissa 48, ordinate 50, and tails 52 are identical in notation, configuration, and functionality to those shown in FIG. 2 and elements indicated by the same reference numerals and/or letters are generally identical in configuration, operation, and functionality as described hereinabove. Calculated spectral response 118 is shown, having an intensity value substantially equal to $I_P$. Spectral response 118 is calculated by algorithm 35 of FIG. 1, by applying different gains for each pixel of the raw image evaluated at respective wavelengths as indicated schematically in the diagram by the arrows. A shorter arrow indicates a smaller gain and a longer arrow indicates a larger gain. Essentially, lower or no gain values are applied to intensity values of wavelengths of response function 46 substantially equal to $I_P$ whereas higher gain values are applied to intensity values of wavelengths of response function 46 substantially less than $I_P$, such as at the tails. The result is that each pixel of the captured image is subject to selective amplification that compensates for non-uniformities of illumination wavelengths, thus transforming the image to have additional colors/wavelengths characteristic of an image produced with "white light" illumination, as described hereinabove. In other words, a color image exhibiting the spectral response of calculated spectral response 118 is obtained, the image having substantially full color intensities over substantially all visible wavelengths. The resultant image is also referred hereinbelow and in the claims as a "modified image".

Figure 4:
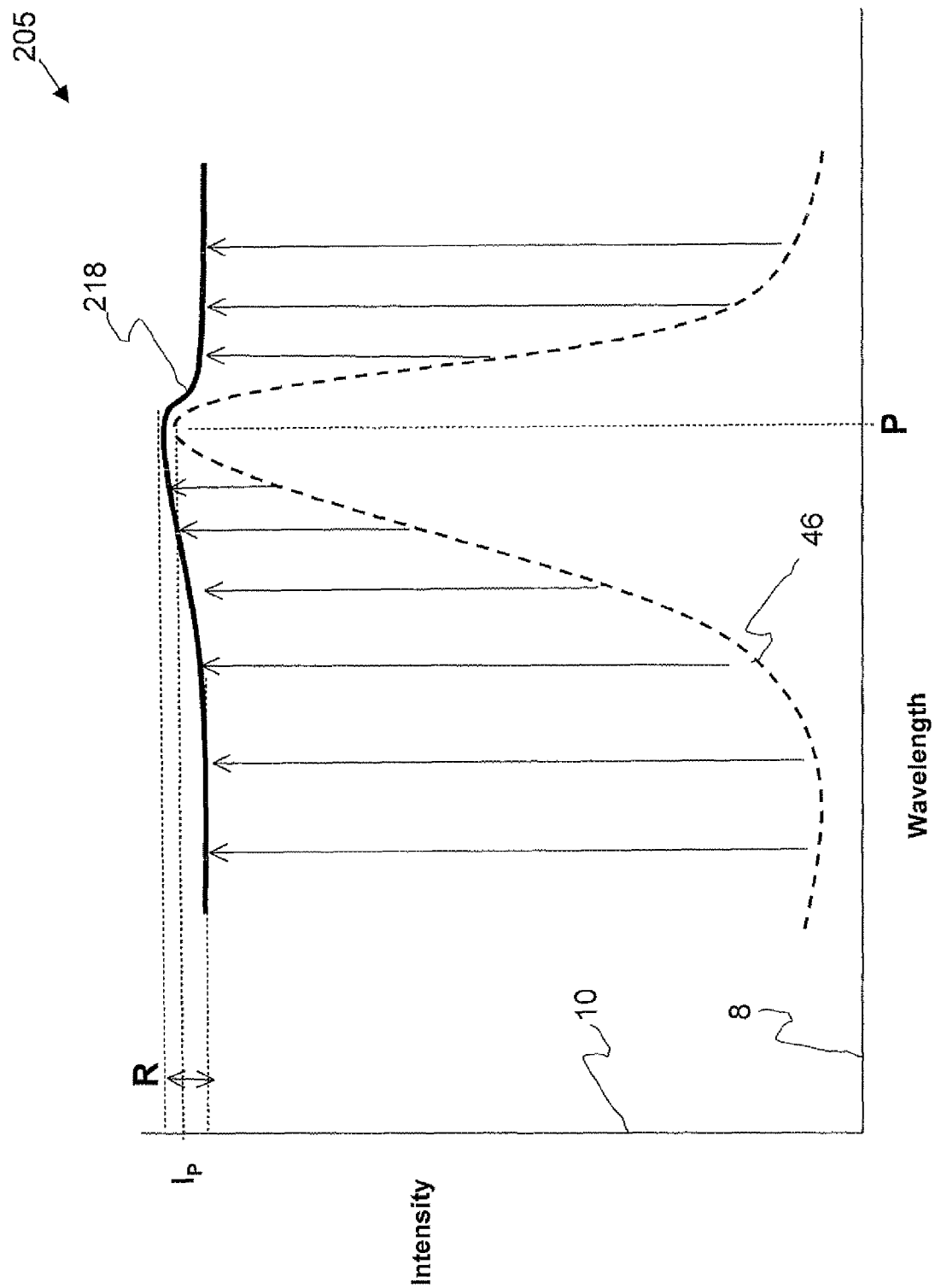
FIG. 4 is a spectral response diagram showing the response function of FIGS. 2 and 3, in accordance with an embodiment of the current invention.

Reference is now made to FIG. 4, which is a spectral response diagram 205 showing response function 46 of FIGS. 2 and 3 in accordance with an embodiment of the current invention. Apart from differences described below, response function 46, abscissa 48, ordinate 50 are identical in notation, configuration, and functionality to those shown in FIGS. 2 and 3 and elements indicated by the same reference numerals and/or letters are generally identical in configuration, operation, and functionality as described hereinabove. Calculated spectral response 218 is shown, having an intensity value approximately equal to $I_P$ and with a range of intensities, intensities which may be greater or smaller than $I_P$, indicated as R. Spectral response 118 is calculated by algorithm 35 of FIG. 1, as described hereinabove, by applying different gains at respective wavelengths as indicated schematically in the diagram by the arrows.

It will be appreciated that the above descriptions are intended only to serve as examples, and that many other embodiments are possible within the scope of the present invention as defined in the appended claims.

What is claimed is:

1. A low power color image capturing system having a power source, the system comprising:
   a. a green light emitting diode adapted to provide illumination having a peak intensity defining a narrow bandwidth, said green light emitting diode being a single illuminator provided by the system;
   b. an image capturing device adapted to capture a raw image from an object illuminated by the narrow bandwidth illuminator; and
   c. a processor adapted to control the system and having an algorithm operatable upon the raw image to provide a modified image;
   wherein the modified image has enhanced color intensities over substantially all visible wavelengths.

2. A low power system according to claim 1, wherein the algorithm is adapted to selectively amplify intensities of wavelengths outside of the narrow bandwidth of the raw image to yield the modified image.

3. A low power system according to claim 2, wherein the algorithm is further adapted to selectively amplify intensities of wavelengths within the narrow bandwidth of the raw image to yield the modified image.

4. A low power system according to claim 3, wherein the modified image has intensities substantially equal to the peak intensity.

5. A low power system according to claim 1 wherein the image capturing device is chosen from a list including: CMOS camera and CCD.

6. A low power system according to claim 1, wherein the power source is a battery.

7. A method of low power color image capturing using a system having a power source, the method comprising the steps of:
   a. taking a green light emitting diode to provide illumination having a peak intensity defining a narrow bandwidth, said green light emitting diode being a single narrow bandwidth illuminator provided by the system;
   b. providing an image capturing device to capture a raw image from an object illuminated by the narrow bandwidth illuminator; and
   c. using a processor to control the system and having an algorithm which operates upon the raw image to provide a modified image;
   wherein the modified image has enhanced color intensities over substantially all visible wavelengths.

8. The method of low power color image capturing, according to claim 7, wherein the algorithm selectively amplifies intensities of wavelengths outside of the narrow bandwidth of the raw image to yield the modified image.

9. The method of low power color image capturing, according to claim 8, wherein the algorithm further selectively amplifies intensities of wavelengths within the narrow bandwidth of the raw image to yield the modified image.

10. The method of low power color image capturing, according to claim 9, wherein the modified image has intensities substantially equal to the peak intensity.

11. The method of low power color image capturing, according to claim 7, wherein the image capturing device is chosen from a list including: CMOS camera and CCD.

12. The method of low power color image capturing, according to claim 7, wherein the power source is a battery.

* * * * *